US012795185B1

(12) United States Patent
VanSickel et al.

(10) Patent No.: US 12,795,185 B1
(45) Date of Patent: Nov. 10, 2026

(54) FUTURE TEMPORARY ACCESS RIGHTS MANAGEMENT

(71) Applicant: DISH Network L.L.C., Englewood, CO (US)

(72) Inventors: Seth VanSickel, Parker, CO (US); Kevin Holland, Littleton, CO (US); Robert Sadler, Denver, CO (US); Aruna Kalidindi, Englewood, CO (US); Ashley Hastings, Littleton, CO (US); Sevrin Huff, Denver, CO (US); Marc Paladino, Highlands Ranch, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 19/296,526

(22) Filed: Aug. 11, 2025

(51) Int. Cl.
*H04N 21/239* (2011.01)
*H04N 21/482* (2011.01)

(52) U.S. Cl.
CPC ....... *H04N 21/2396* (2013.01); *H04N 21/482* (2013.01)

(58) Field of Classification Search
None
See application file for complete search history.

(56) References Cited

U.S. PATENT DOCUMENTS

| | | | | |
|---|---|---|---|---|
| 6,536,041 | B1 * | 3/2003 | Knudson | H04N 21/435 725/50 |
| 9,014,546 | B2 * | 4/2015 | Shimy | H04N 21/4755 386/296 |
| 10,338,794 | B2 * | 7/2019 | Persson | H04L 67/141 |
| 2013/0263174 | A1 | 10/2013 | Chaudhari et al. | |

* cited by examiner

*Primary Examiner* — James R Marandi
(74) *Attorney, Agent, or Firm* — Kilpatrick Townsend & Stockton LLP

(57) ABSTRACT

Systems and methods for managing access to streaming media content involve granting a user temporary access rights to a first set of media content streams. The system provides various interfaces that inform the user about upcoming and expiring time periods during which particular media content streams are available. These interfaces can alert the user to a time at which upcoming access rights go into effect and a time at which current access rights expire, based on a state of the user's account. Access to additional media content streams may be made available before or after the time period of the first set.

20 Claims, 10 Drawing Sheets

FUTURE TEMPORARY ACCESS RIGHTS MANAGEMENT

BACKGROUND

When access to streaming media content is desired, such as television channels, a user typically purchases a subscription that renews on a monthly or annual basis. Such a subscription allows the user to access the included streaming media content at any time while the subscription remains active. Such a subscription is typically to a predefined grouping of streaming media content, such as a predefined group of television channels. Such an arrangement may not be ideal for a customer. For example, much of the streaming media content, even on a desired television channel, may not be of interest.

SUMMARY

In some embodiments, a method for managing future temporary access rights to streaming media content is provided. The method may comprise receiving, by a streaming media content distribution system, a service request for a user account indicative of a defined future time period for which access is permitted to a first plurality of media content streams. The service request can be received while the user account is in an inactive state. The defined future time period may define a start time that occurs in the future and an end time that occurs farther in the future. In response to the received service request, the streaming media content distribution system may set the user account to be in a first active state. When the streaming media content distribution system is accessed by a streaming media player in association with credentials of the user account in the first active state, the first active state may cause information corresponding to the defined future time period to be presented, the first plurality of media content streams to be inaccessible, and a second plurality of media content streams to be accessible. The second plurality of media content streams may not include any media content streams of the first plurality of media content streams. Based on the start time, the streaming media content distribution system can set the user account to a second active state. When the streaming media content distribution system is accessed by the streaming media player in association with the credentials of the user account in the second active state, the second active state can cause the first plurality of media content streams to be accessible. Based on the end time, the streaming media content distribution system may set the user account to be in the inactive state. When the streaming media content distribution system is accessed by the streaming media player in association with the credentials of the user account in the inactive state, the inactive state may cause the first plurality of media content streams to be inaccessible.

Embodiments of such a method may include one or more of the following features, which may be separately combined with the method detailed above. The method can further comprise causing a user interface to be output that indicates at least some media content streams of the plurality first of media content streams and a plurality of media content items scheduled to be streamed on each of the plurality of media content streams during the defined future time period. The method may also include receiving, by the streaming media content distribution system, a second service request for the user account requesting allocation of a plurality of future temporary access rights packages, wherein the start time and stop time for each of the plurality of future temporary access rights packages is undefined at the time the second service request is received. When the streaming media content distribution system is accessed by the streaming media player in association with credentials of the user account in the inactive state, the second plurality of media content streams can be accessible via the user account. The method may further comprise causing a user interface to be output by the media streaming device that indicates a plurality of media content items that correspond to only sporting events scheduled to be streamed on the first plurality of media content streams during the defined future time period. A selection of the defined future time period can be received from a plurality of defined future time period options, wherein the plurality of defined future time period options have been predefined by the streaming media content distribution system. The method may also comprise causing a user interface to be presented to be output by the media streaming device while in the second active state, wherein the user interface indicates the end time. A user interface can be caused to be output by the media streaming device while in the inactive state, wherein the user interface provides a plurality of access duration elements for a plurality of future time periods, each of which provide access to a specific media content item. The method can also include causing a user interface to be presented to be output by the media streaming device while in the first active state, wherein the user interface indicates the start time of the defined future time period.

In some embodiments, a streaming media content distribution system for managing future temporary access rights to streaming media content is provided. The system can comprise one or more processors and a memory communicatively coupled to the processor, the memory storing instructions that, when executed by the processor, cause the one or more processors to perform a series of actions. The actions may include receiving a service request for a user account indicative of a defined future time period for which access is permitted to a first plurality of media content streams. The service request can be received while the user account is in an inactive state, and the defined future time period may define a start time that occurs in the future and an end time that occurs farther in the future. In response to the received service request, the instructions can cause the processors to set the user account to be in a first active state. When the system is accessed by a streaming media player with the user account's credentials in the first active state, it may cause information for the defined future time period to be presented, the first plurality of media content streams to be inaccessible, and a second plurality of media content streams to be accessible. The second plurality of media content streams may not include any media content streams of the first plurality of media content streams. Based on the start time, the instructions can cause the processors to set the user account to a second active state, which can cause the first plurality of media content streams to be accessible. Based on the end time, the instructions can cause the processors to set the user account to be in the inactive state, which may cause the first plurality of media content streams to be inaccessible.

Embodiments of such a system may include one or more of the following features, which may be separately combined with the system detailed above. The instructions, when executed, may further cause the processors to cause a user interface to be output that indicates a plurality of media content streams and a plurality of media content items scheduled to be streamed on each of the plurality of media content streams during the defined future time period. The instructions can also cause the processors to receive a second service request for the user account requesting allocation of a plurality of future temporary access rights packages, wherein a respective start time and a respective stop time for each package is undefined when the request is received. When the system is accessed by the streaming media player with the user account's credentials in the inactive state, the second plurality of media content streams may be accessible. The instructions may further cause the processors to cause a user interface to be output by the media streaming player that indicates a plurality of media content items that correspond to only sporting events scheduled to be streamed on the first plurality of media content streams during the defined future time period. The processors can be caused to receive a selection of the defined future time period from a plurality of predefined future time period options. The instructions can cause a user interface to be output by the media streaming player while in the second active state, which indicates the end time. The processors may also be caused to have a user interface be output by the media streaming player while in the inactive state, where for a specific media content item, the user interface provides a plurality of access duration elements, each providing access for a different future time period. The instructions can also cause the processors to cause a user interface to be output by the media streaming player while in the first active state, which indicates the start time of the defined future time period. The system may further comprise the streaming media player, which can communicate with the one or more processors via the Internet.

In some embodiments, a non-transitory processor-readable medium is provided. The medium can comprise processor-readable instructions configured to cause one or more processors of a streaming media content distribution system to receive a service request for a user account indicative of a defined future time period for which access is permitted to a first plurality of media content streams. The service request may be received while the user account is in an inactive state, and the defined future time period may define a start time that occurs in the future and an end time that occurs farther in the future. The instructions can also cause the processors to, in response to the received service request, set the user account to be in a first active state. When the streaming media content distribution system is accessed by a streaming media player in association with credentials of the user account in the first active state, the first active state can cause information corresponding to the defined future time period to be presented, the first plurality of media content streams to be inaccessible, and a second plurality of media content streams to be accessible. The second plurality of media content streams may not include any media content streams of the first plurality of media content streams. The instructions can further cause the processors to, based on the start time, set the user account to a second active state. When the streaming media content distribution system is accessed by the streaming media player in association with the credentials of the user account in the second active state, the second active state may cause the first plurality of media content streams to be accessible. Finally, the instructions can cause the processors to, based on the end time, set the user account to be in the inactive state, which in turn can cause the first plurality of media content streams to be inaccessible.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Modern content consumers prefer flexibility in how they engage with paid content. Conventionally, such as with most television subscription packages, a user can subscribe on a monthly basis to a particular plan that involves a predefined grouping of television channels. Such an arrangement may not be desirable to some users. For example, a user may tend to not watch a particular television channel unless it is streaming a particular sports team's game. Therefore, access to the television channel may be desired by the user a limited number of times, such as just a few times each year or month. Thus, the user may not be able to justify obtaining access rights to television channel on a monthly or annual basis for a resource that is accessed so infrequently.

Streaming media services have advantages over conventional television arrangements in that no specialized equipment is needed at the user's premises. For example, while a set top box (STB) and possibly a satellite antenna (or cable network connection) can be necessary in order to obtain television service from a television service provider, access to media content streams can be provided as over the top (OTT) content via a streaming media service which the user likely already has. Thus, the barrier to entry to accessing a streaming media service that the user has not previously used is low compared to conventional television.

To begin use of a streaming media service, a user may download an application to a computerized device (e.g., smart television, tablet computer, smartphone, mobile device, gaming device), create an account, and access the streaming media service via a preexisting Internet connection. The user may then desire to obtain access rights that are for a defined period of time in the future. For example, these access rights can correspond to a defined group of media content streams for a time period in the future.

As detailed herein, various technical challenges exist in allowing a user to create such a short-term subscription that begins and ends in the future, such as for a future week, weekend, or day. Namely, the streaming media application (which can be installed and executed on an end user device, such as a smart television, mobile device, or tablet computer) and the streaming media service may need to create and output specialized interfaces that allow a user to be informed about upcoming and expiring time periods during which particular media content streams are available.

In addition to being granted access to a first set of media content streams by temporary access rights being obtained in association with a user account, access to a second set of media content streams may be made available before and/or after the time period during which access to the first set is permitted. Based on a state of a user's account, interfaces can be presented that alert a user to a time at which upcoming access rights go into effect and a time at which access rights expire.

Figure 1:
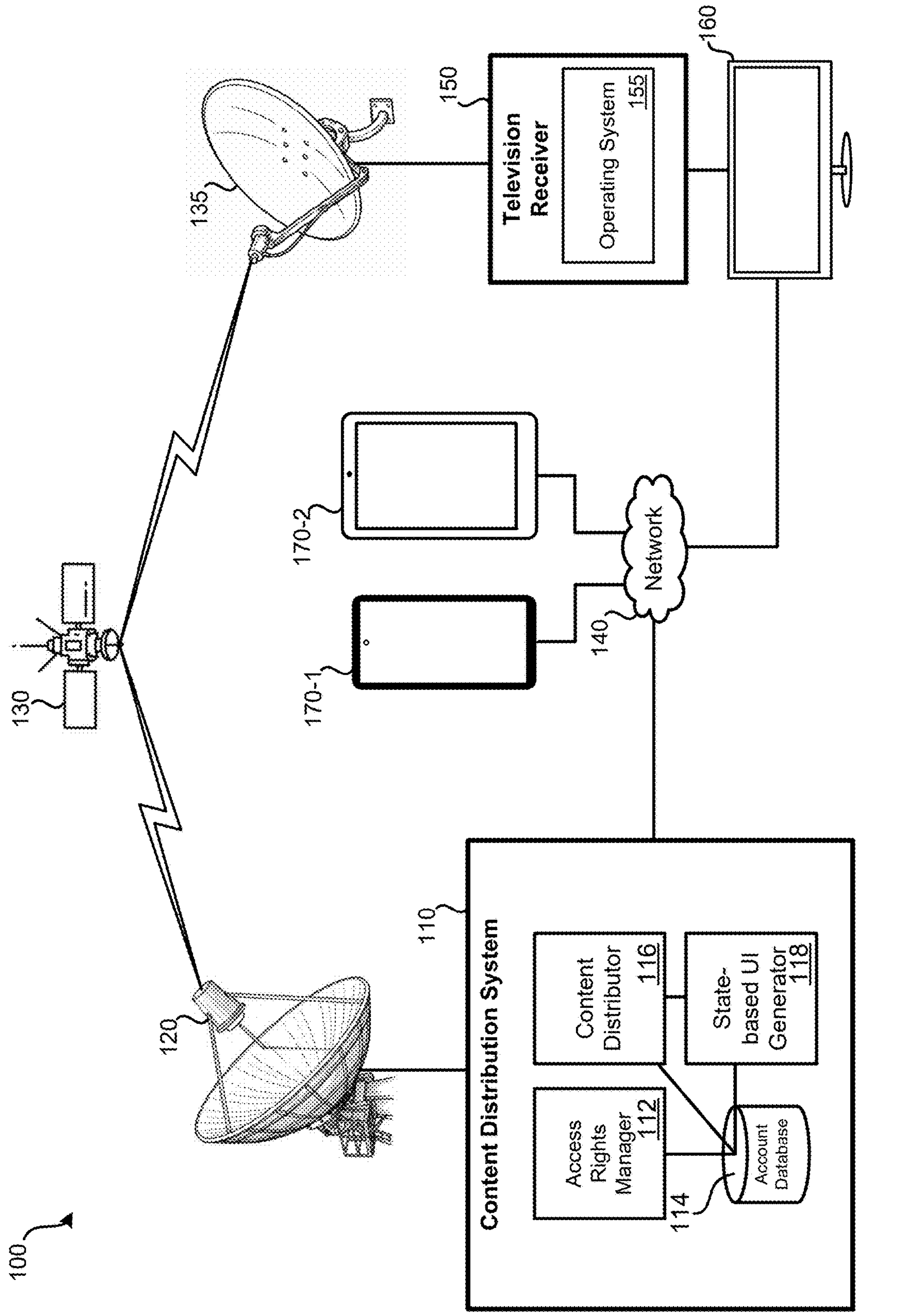
FIG. 1 illustrates an embodiment of a streaming media content system.

Further detail regarding these and additional embodiments is provided in relation to the figures. FIG. 1 illustrates an embodiment of a streaming media content system ("system 100"). System 100 may include: content distribution system 110, satellite transmitter equipment 120, satellite 130, satellite antenna 135, network 140, television receiver 150, television 160, and media streaming devices 170. Alternate embodiments of system 100 may include fewer or greater numbers of components. While only one satellite antenna 135, television receiver 150, television 160 and two media streaming devices 170 are illustrated, it should be understood that multiple (e.g., tens, thousands, millions) instances of such equipment can be present in embodiments of system 100. System 100 represents an arrangement in which media content can be transmitted by content distribution system 110 via satellite, via a network connection (e.g., the Internet), or both. In alternative embodiments of system 100, only the network connection or only the satellite communication aspects of system 100 may be present. In still other embodiments, alternative or additional forms of communication may be present, such as a cable-based content distribution network, or cellular network-based content distribution system.

Content distribution system 110 and satellite transmitter equipment 120 may be operated by a television service provider. A television service provider may distribute media content to end users, such as television channels that distribute live and scheduled television programming. Such television channels can be distributed in the form of media content streams. Content distribution system 110 may receive feeds of one or more live television channels from various sources, such as content providers. The media content can include video and audio components. Content distribution system 110 can also store content that can be used to create additional media content streams or to distribute in an alternative format, such as on-demand content.

To distribute media content streams (e.g., television channels) for presentation to users, feeds of the media content streams may be relayed to user equipment via one or more television distribution satellites. Each satellite may relay multiple transponder streams. Satellite transmitter equipment 120 may be used to transmit a feed of one or more media content streams from content distribution system 110 to satellite 130 (in some embodiments, multiple satellites are used). While a single content distribution system 110 and satellite transmitter equipment 120 are illustrated as part of system 100, it should be understood that multiple instances of transmitter equipment may be used, possibly scattered geographically, to communicate with one or more satellites, such as satellite 130. Different media content streams may be transmitted to satellite 130 from different instances of transmitting equipment. For instance, a different satellite antenna of satellite transmitter equipment 120 may be used for communication with satellites in different orbital slots.

Satellite 130 may be configured to receive signals, such as media content streams, from satellite transmitter equipment 120. Satellite 130 may relay received signals from satellite transmitter equipment 120 to multiple instances of user equipment. Satellite 130 may be in geosynchronous orbit; in other embodiments, a constellation of multiple satellites in alternative orbits (e.g., low earth orbit, middle earth orbit) can be used instead. Each of the transponder streams transmitted by satellite 130 may contain multiple media content streams transmitted as packetized data. For example, a single transponder stream may be a serial digital packet stream containing multiple media content streams. Therefore, packets for multiple television channels may be interspersed.

Satellite antenna 135 may be a piece of user equipment that is used to receive transponder streams from one or more satellites, such as satellite 130. Satellite antenna 135 may be provided to a user for use on a subscription basis to receive media content streams provided by content distribution system 110 via satellite transmitter equipment 120 and satellite 130. Satellite antenna 135, which may include one or more low noise blocks (LNBs), may be configured to receive transponder streams from multiple satellites and/or multiple transponders of the same satellite. Satellite antenna 135 may be configured to receive media content streams via transponder streams on multiple frequencies. A tuner of television receiver 150 may tune to a transponder stream being received by satellite antenna 135. The tuner can then be re-tuned to another transponder of the same or a different satellite. A television receiver 150 having multiple tuners may allow for multiple transponder streams to be received at the same time.

In communication with satellite antenna 135 may be one or more television receivers, such as television receiver 150. Television receiver 150 may be configured to decode signals received from satellite 130 via satellite antenna 135 for output and presentation via a display device, such as television 160. A television receiver may be incorporated as part of a television or may be a separate device, which may be referred to as a set-top box (STB). Television receiver 150 may decode signals received via satellite antenna 135 and provide an output to television 160 (e.g., via HDMI). A television receiver is defined to include STBs and also circuitry having similar functionality that may be incorporated with another device. For instance, circuitry similar to that of a television receiver may be incorporated as part of a television or other form of display device. As such, while FIG. 1 illustrates an embodiment of television receiver 150 as separate from television 160, it should be understood that, in other embodiments, similar functions may be performed by a television receiver integrated with television 160.

Television 160 may be used to present video and/or audio decoded and output by television receiver 150. Executed on television receiver 150 can be operating system 155. Operating system 155 can allow for one or more applications to be presented, which can allow for a user to access and select media content streams for viewing. Operating system 155 can allow for an application to be executed in television receiver 150 that allows for an interactive electronic programming guide (EPG) to be output for presentation. Television 160 may take other forms in other embodiments, such as a monitor, display, computer, or some other device configured to display video and, possibly, play audio.

Additionally or alternatively, network 140 may serve as a communication channel between content distribution system 110, media streaming devices 170, and television 160. Via network 140, bidirectional exchange of data may occur between media streaming devices 170 and content distribution system 110. As an example, on-demand content or media content can be transmitted via network 140 to media streaming devices 170. Network 140 can be used to distribute media content streams to media streaming devices 170 and television 160. In such embodiments, network 140 can include the Internet and can include one or more additional public or private networks, such as a wireless local area network (WLAN). In such embodiments, television 160 is a smart television capable of network communication or is connected with an external device, such as a streaming device, that is capable of such network communication. Media streaming devices 170 can have hardware incorporated that allow for wireless or wired communication with network 140. Media streaming devices 170 can include smartphone 170-1 and tablet computer 170-2. Other various types of media streaming devices may also be used, such as a gaming device, laptop computers, and desktop computers. With such media streaming devices 170 (including television 160), media content streams can be streamed via the Internet rather than being transmitted via another network, such as the aforementioned satellite communication network.

On media streaming devices 170 and television 160, an application distributed by the operator of content distribution system 110 can be downloaded and installed to enable content to be accessed and output for presentation. To access content from within such an application, a user may be required to establish a user account, which can then be reused by the user across multiple media streaming devices and/or televisions. The application may include the features of operating system 155, thus allowing the same or similar user interfaces to be presented and interacted with by an end user.

Content distribution system 110, which can include one or more computer server systems, can execute various components that can be implemented using special-purpose software executed on general-purpose hardware. Such components can include: access rights manager 112; account database 114; content distributor 116; and state-based UI generator 118. Other embodiments can include more or fewer components.

Access rights manager 112 controls whether a particular user account is permitted to access one or more media content streams. Access rights manager 112 can cause access to particular defined sets of media content streams to either be permitted or blocked. For television receivers, this can include controlling whether television receiver 150 is provided with a decryption key that can be used to descramble or decrypt transmissions of such media content streams. That is, the media content streams can be broadcast by satellite 130 to many instances of user equipment that are scattered geographically, but only some of those instances of user equipment may possess cryptographic keys necessary to decrypt or descramble the media content streams for viewing.

Access rights manager 112 can be used to control what content a user account has access to. In response to receiving a permission message, account database 114 can be updated to reflect dates/times during which access to one or more sets of media content streams is permitted. Account database 114 can indicate, for a given user account, indications of which sets of media content streams the user account is permitted to access. Account database 114 can also store indications of when access to particular sets of media content streams begin and end. The start time for access to a particular set of media content streams may be hours, days, or even weeks into the future. Other components can access account database 114 to determine when sets of media content streams should be permissible to access and what UIs should be presented.

Access rights manager 112 may update access rights for a user account in account database 114 in response to a payment or request being made that is mapped to a particular user account and a particular set of media content streams. For example, via a UI presented in an application on smartphone 170-1, a user can request access to a particular set of media content streams for a particular time range. A billing account tied to the user account can then be billed in exchange for access to the set of media content streams.

State-based UI generator 118, which can be in communication with content distributor 116, can determine which UIs should be output for a particular user account based on information stored in account database 114. As detailed in relation to FIG. 2, the particular state of a user account, based on if/when access rights to a set of media content streams begins and ends, can be used to determine UIs presented to a user accessing content distribution system 110 via a particular user account.

Content distributor 116 is used to cause UIs and sets of media content streams to be transmitted to media streaming devices 170 and/or access to sets of media content streams to be controlled, such as for television receiver 150. Based on information obtained from account database 114 and state information obtained from state-based UI generator 118, content distributor 116 can provide access to one or more sets of media content streams and cause appropriate UIs to be presented. Referring to media streaming devices 170, content distributor 116 can allow or block media content streams with a set of media content streams to be streamed. For television receiver 150, content distributor 116 can control whether a cryptographic key is provided via satellite 130 (or network 140) that allows for decryption of the set of media content streams as unicast to many sets of user equipment.

Figure 2:
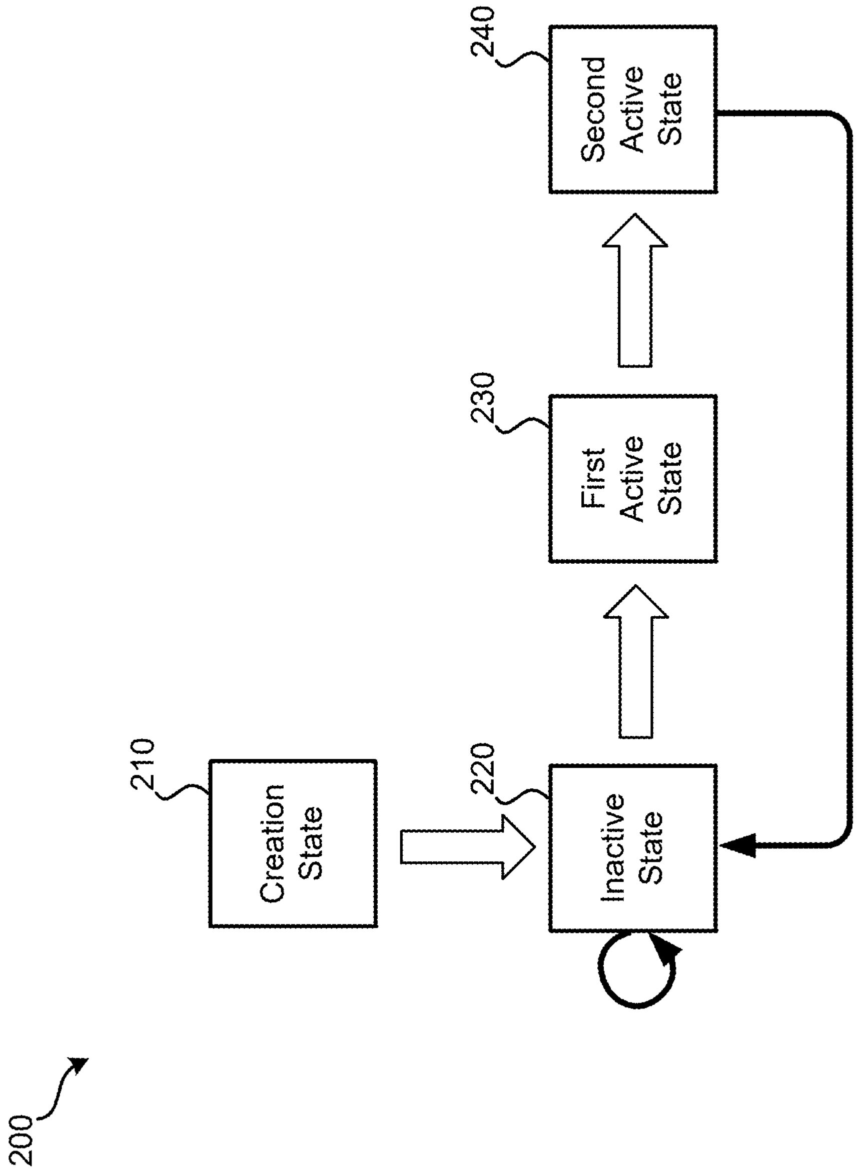
FIG. 2 illustrates an embodiment of a state diagram for content streaming.

FIG. 2 illustrates an embodiment of a state diagram 200 for content streaming. State diagram 200 can represent how state-based UI generator determines which UIs should be presented based on the user account's state, as determined based on information in user account database 114.

At state 210, a user account can be created. Upon initially accessing an application of a content streaming entity or accessing their website, a user account and associated access credentials (e.g., a password, a two-factor authentication method) can be created. Assuming a user does not immediately purchase any access rights, the user account, once fully created, can transition to inactive state 220.

In inactive state 220, the user account is not permitted to access any set of multiple available media content streams. Each of these sets may be accessed via the user account if a fee is paid. If no fee is paid, no access is permitted. However, while in inactive state 220, access to one or more additional pieces of content, which can include other media content streams, can be permitted. For example, various media content streams may always be "free" to access for a user account, even if in inactive state 220. Alternatively or additionally, on-demand content may also be accessible (while a media content stream involves pre-defined media content being transmitted at a scheduled time similar to traditional television broadcasts, on-demand content can be requested for streaming by the user at the user's convenience).

While in inactive state 220, when accessing the application, various UIs can be presented that allow a user to obtain access rights to one or more sets of media content streams, such as in exchange for money or points. At any time while in inactive state 220, access rights to one or more sets of media content streams can be obtained by a user in association with the account. Once such access rights are obtained, the user account is transitioned from inactive state 220 to first active state 230.

In first active state 230, the user account may still be permitted to access only the same media content available in inactive state 220. However, one or more UIs may be presented that provide a date/time at which access to one or more sets of media content streams will begin for the user account. Additionally or alternatively, one or more UIs can be accessed and presented that define which media content streams and programming are scheduled for broadcast during the defined time period which the user account will have access to the one or more media content streams. This allows a user to confirm that a desired piece of programming will be available for viewing during the time period for which access rights were obtained.

Once a start time/date of access rights is reached, first active state 230 transitions to second active state 240. In second active state, the user account can be used to access the same media content available in inactive state 220 and first active state 230 and additionally any media content stream, including the set of media content streams for which the user account has acquired access. Additionally, one or more UIs may be presented that defines when access to the set of media content streams ends.

At an end time/date of the access rights for the set of media content streams, the user account can be transitioned back to inactive state 220. The user account can remain in inactive state 220 until access rights are again obtained (e.g., purchased) in association with the user account.

FIGS. 3-8 represent various UIs that can be presented depending on the state of a user account. Such UIs can be output via television receiver 150 and connected television 160, television 160 (without television receiver 150 if television 160 is a smart television or connected with a streaming device), and media streaming devices 170. Each of such UIs represent exemplary embodiments—specific arrangements, graphics, layouts, and text can be varied by embodiment.

Figure 3:
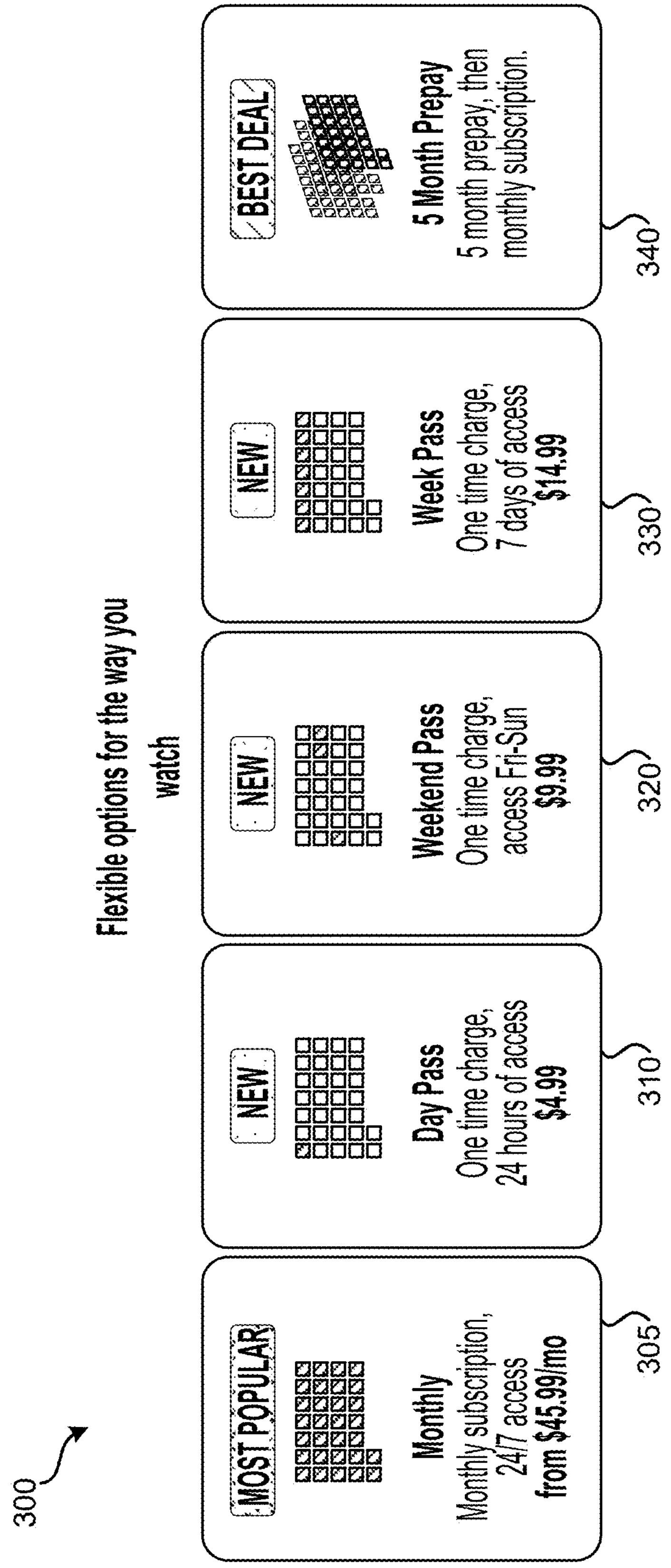
FIG. 3 illustrates an embodiment of a user interface for selecting an access rights package.

FIG. 3 illustrates an embodiment of a user interface 300 for selecting an access rights package. UI may be presented when a user account is in an inactive state. Various options may be available for obtaining access rights to one or more sets of content media streams. Option 305 can represent a traditional option in which a user account is granted access to a set of content media streams for a cost on a monthly basis. The particular media streams (e.g., television channels) in a set of media content streams can be defined by the provider of the streaming service and may not be configurable by the end user. That is, the media content streams present in each set of media content streams is predefined. Option 340 is a variation on the traditional model in which a time period is prepaid, and when the time period expires, the user account is still permitted access but is billed on a monthly basis.

In UI 300, a user can also be presented option 310, option 320, and/or option 330 from which to select an access rights package. Each access rights package of these options are associated with: (1) a set of media content streams and (2) a defined time period. Therefore, an access rights package for each of options 310, 320, and 330 can begin at some date selected by the user in association with the user account. If a user selects option 310 or option 330, access may begin immediately for the defined time period (e.g., a day or a week) or the user may be permitted to select a future date at which the access rights package will provide access to the set of media content streams. If a user selects option 320, the user may be permitted to select among upcoming weekends. The user account is then granted access rights beginning and ending on predefined dates/times for the selected weekend. Similarly, if a user selects option 330, the user may be permitted to select among upcoming weeks. The user account is then granted access rights beginning and ending on predefined dates/times for the selected week. Whichever option the user selects, the selection can be recorded to the account database and the user account can be transitioned from the inactive state to the first active state as detailed in relation to FIG. 2 assuming that the start date and time is not immediate. If immediate, the user account may be transitioned to the second active state. Whether the first or second active state, one or more different UIs may be presented than in the inactive state.

Figure 4:
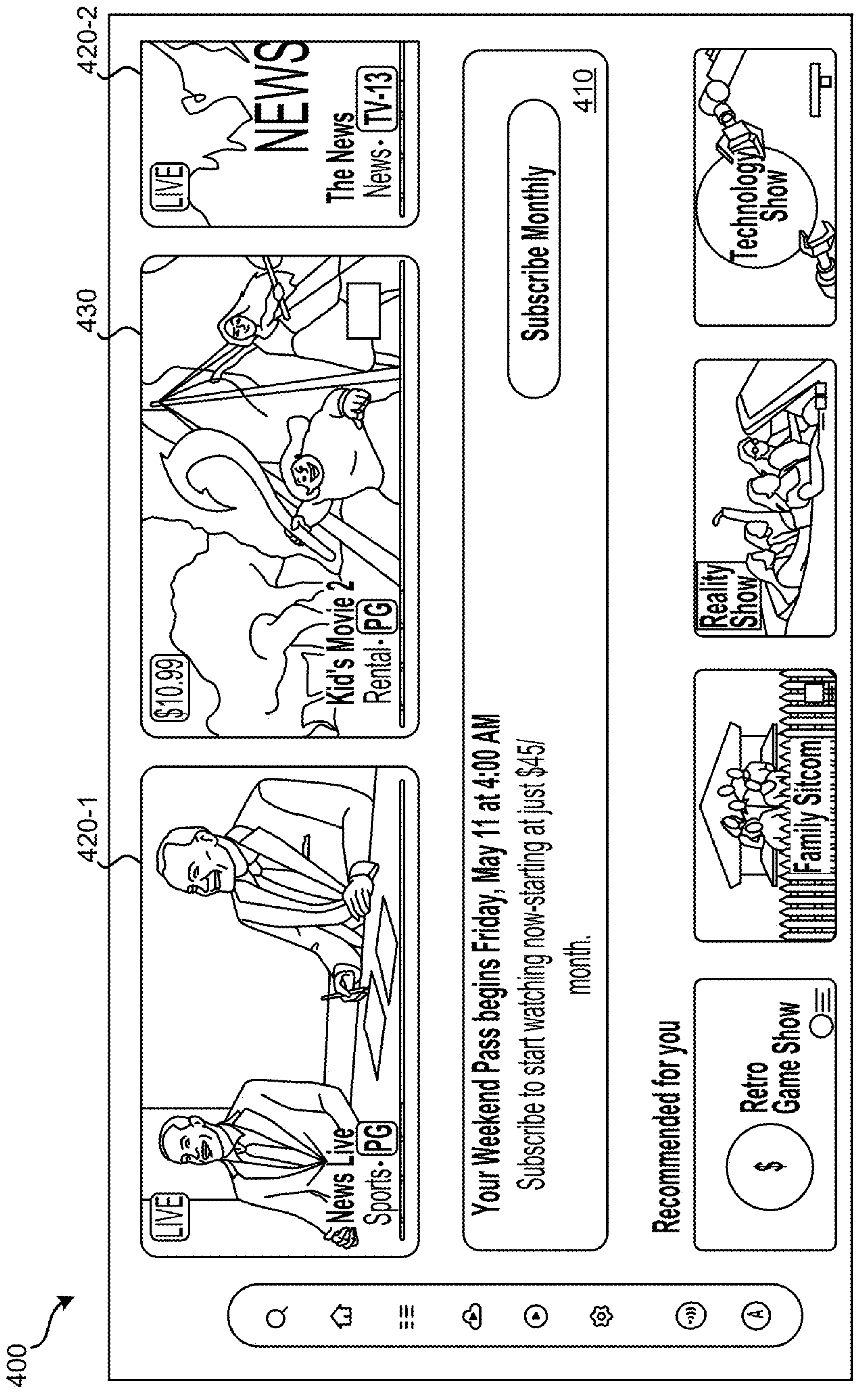
FIG. 4 illustrates an embodiment of a user interface used for a first active state.

FIG. 4 illustrates an embodiment of a user interface 400 used for the first active state. In the first active state, access rights to a set of media content streams has been obtained. Since the first active state is active, the start time and date for access to the set of media content streams has not been reached. User interface 400 is presented in which region 410 defines the start time and date for the access rights package through which access to the set of media content streams will begin. Region 410 can also define the type of access rights obtained for the user account. In this example, the access rights is for an entire weekend, corresponding to option 320. An option in region 410 may be presented in which an upgrade can be made to a reoccurring access rights package (e.g., monthly).

The user account continues to receive access to various other content, such as media content streams 420, which can be available in inactive mode. On-demand content 430, with which a separate fee may be associated, may also be available.

Figure 5:
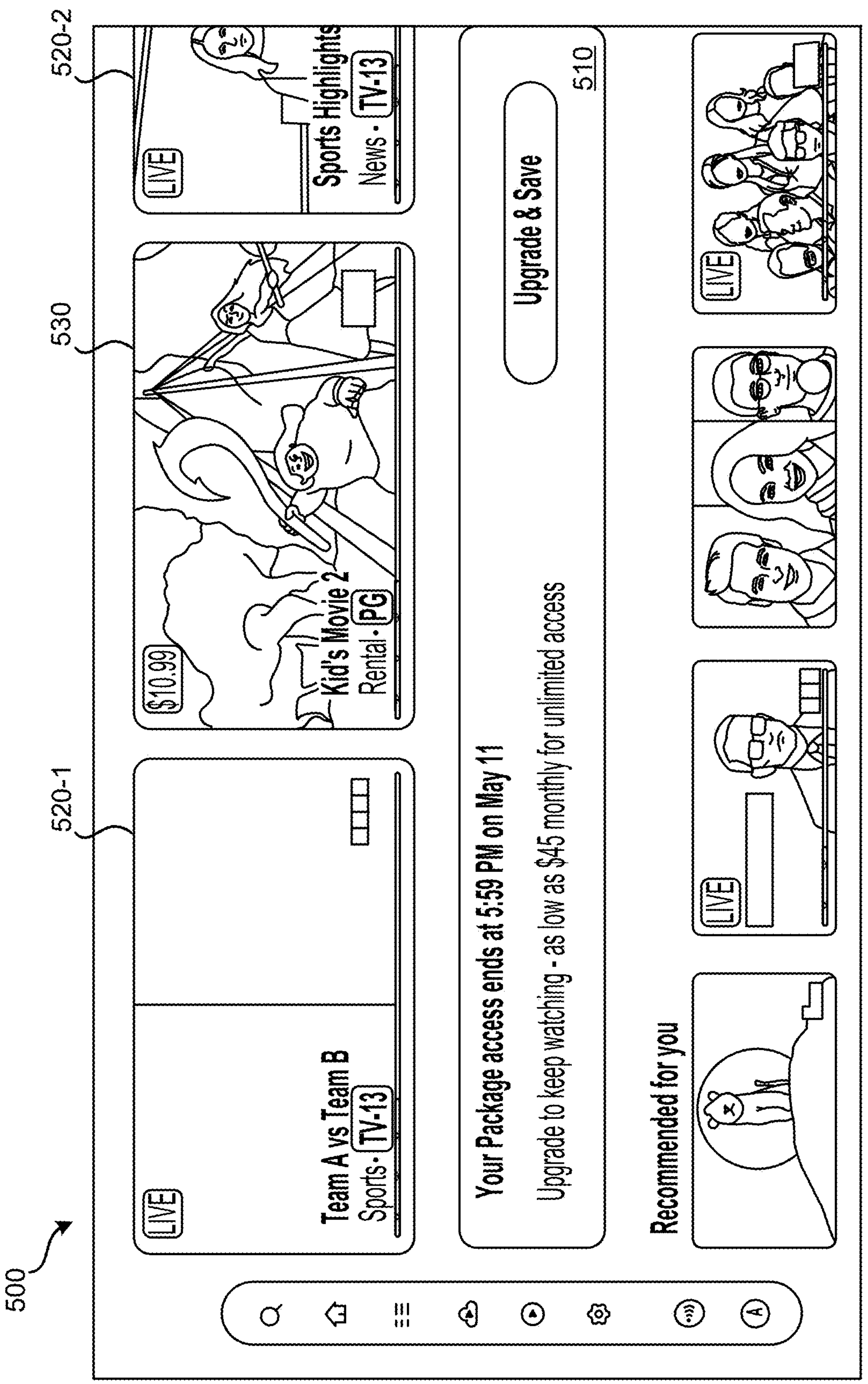
FIG. 5 illustrates an embodiment of a user interface used for a second active state.

FIG. 5 illustrates an embodiment of a user interface 500 used for a second active state. In the second active state, access rights to a set of media content streams has been obtained and is active. Since the second active state is active, the start time and date for access to the set of media content streams has been reached, but the end time and time for access has not yet been reached. User interface 500 is presented in which region 510 defines the end time and date, at which point access to the set of media content streams will end for the access rights package. Region 510 can also define the type of access rights obtained for the user account. An option in region 510 may be presented in which an upgrade can be made to a reoccurring access rights package (e.g., monthly).

The user account has access to various content available through the set of media content streams to which access has been granted, such as media content streams 520. Such access is only permitted in the second active mode. On-demand content 530, with which a separate fee may be associated, may also be available.

Figure 6:
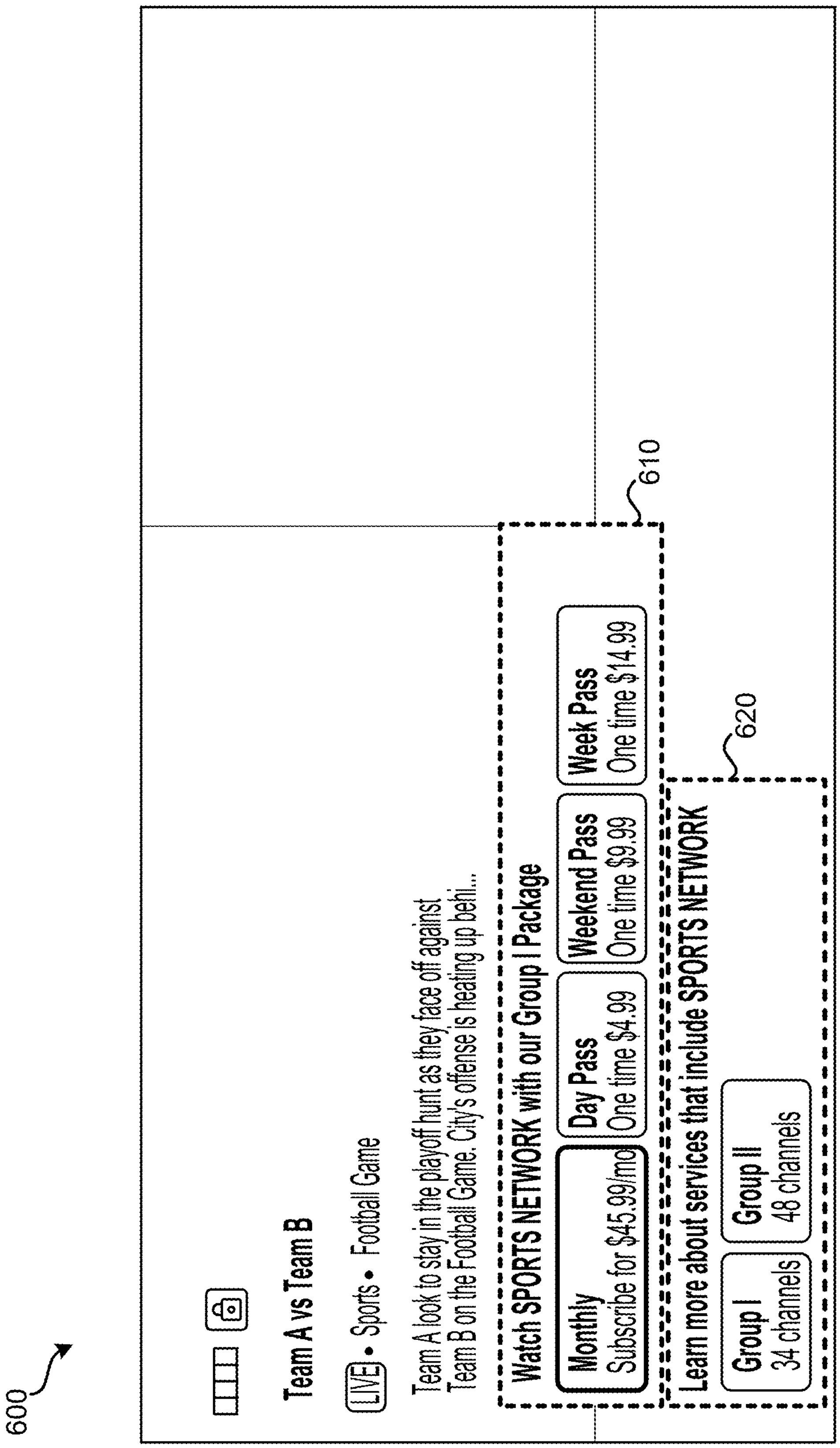
FIG. 6 illustrates another embodiment of a user interface for selecting an access rights package.

FIG. 6 illustrates an embodiment of a user interface 600 for selecting an access rights package. UI 600 can be presented when a user account is in an inactive mode. UI 600 pertains to a particular piece of media to be streamed on a particular media content stream. Graphic 605 is indicative that the user account does not have access to the media stream when the piece of media will be streamed.

UI 600 presents region 610, which provides a user with multiple options to obtain access to the particular piece of media content for when it will be streamed. Selection of any of the options in region 610 guarantees the user access rights to the particular piece of media content. Selection of any of options in region 610 gain the user account access via an access rights package to a set of media content streams that includes the media content stream on which the piece of media content will be streamed. Additionally, region 620 can indicate some or all access rights packages that include the media content stream. For example, the user may prefer to obtain access to a larger set of media content streams than offered in region 610. In this example, the options in region 610 give the user account access to a set of media content streams including 34 television channels. In region 620, the user could instead select an option such that 48 television channels are included in the set of media content streams for which the user account is granted access. The media content streams in each of these sets is predetermined by the streaming provider.

Figure 7:
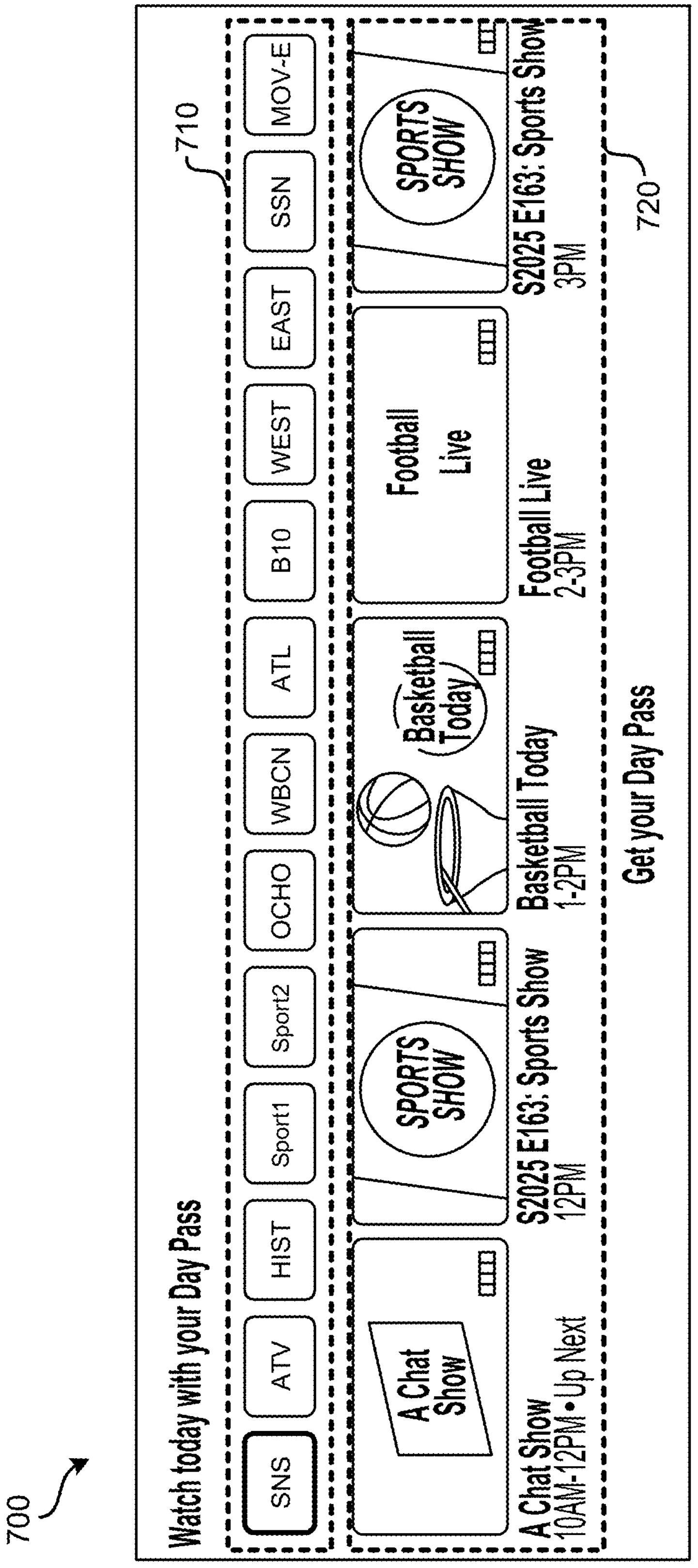
FIG. 7 illustrates an embodiment of a user interface that defines available content for an access rights package.

FIG. 7 illustrates an embodiment of a user interface 700 that defines available content for an access rights package. UI 700 may be presented when the user account is in an inactive state and, thus, has not yet acquired rights to an access rights package. User interface 700 provides a user with a UI through which the user can confirm that if a particular access rights package is obtained, the user will have access to particular pieces of content on a set of content media streams scheduled to be streamed during the defined time period of the access rights package.

As shown, a user can make a selection of a media content stream in region 710. Multiple specific pieces of media content are then presented in region 720 that (1) are available on the selected media content stream and (2) are scheduled to be streamed during the time period associated with the access rights package. In the illustrated example, the user has selected a day pass corresponding to option 310 of FIG. 3; thus, the pieces of media content are scheduled to be streamed during the day selected by the user.

Figure 8:
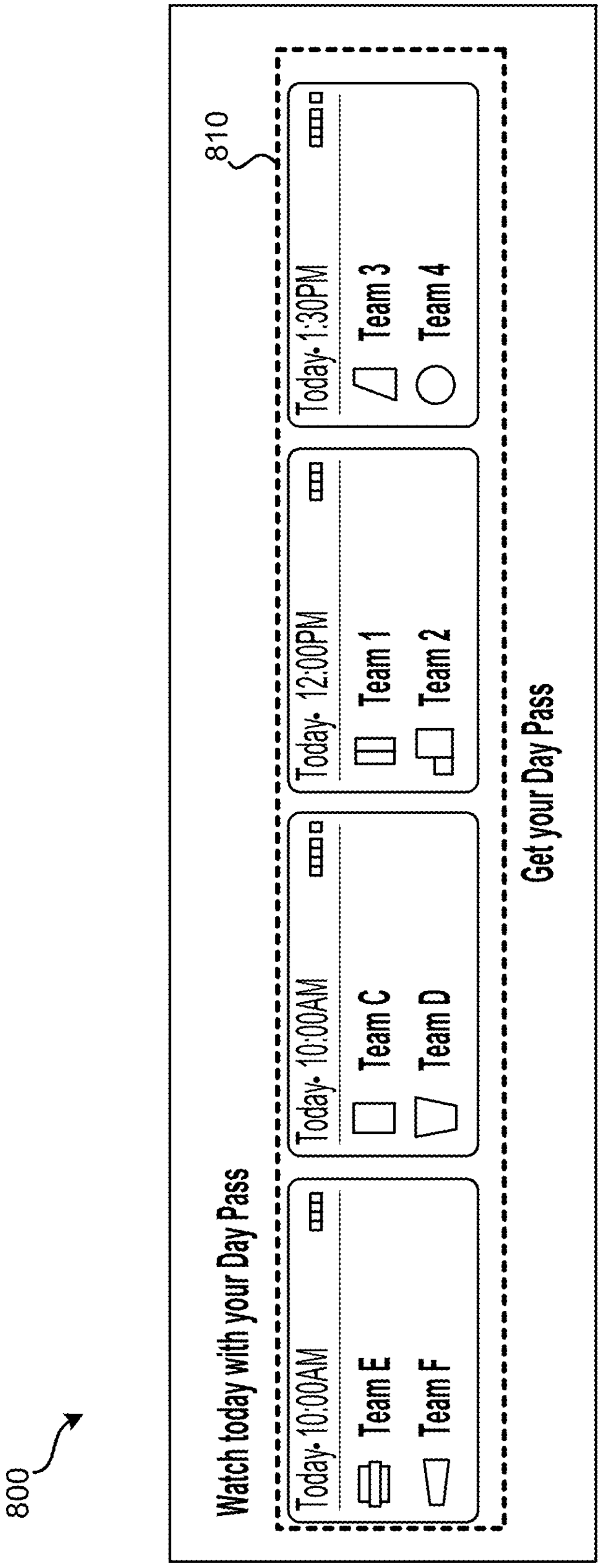
FIG. 8 illustrates another embodiment of a user interface that defines available content for an access rights package.

FIG. 8 illustrates an embodiment of a user interface 800 that defines available content for an access rights package. UI 800 may be presented when the user account is in an inactive state and, thus, has not yet acquired rights to an access rights package. While UI 700 allows a user to browse media content streams and see what media content will be available through the access rights package on a specific media content stream, UI 800 provides a user with a list of events across multiple media content streams that the user will have access to through an access rights package. Multiple specific pieces of media content are presented in region 810 that (1) fall into a particular category of content and (2) are scheduled to be streamed during the time period associated with the access rights package. For example, the category may be college football games, Major League Baseball games, Olympic events, National Football League games, award shows, gameshows, news shows, etc.

In the illustrated example, the user has selected a day pass corresponding to option 310 of FIG. 3; thus, the pieces of media content in region 810 are part of a same category scheduled to be streamed during the day selected by the user. For each piece of media content, a day, time, and media content stream may be indicated.

Figure 9A:
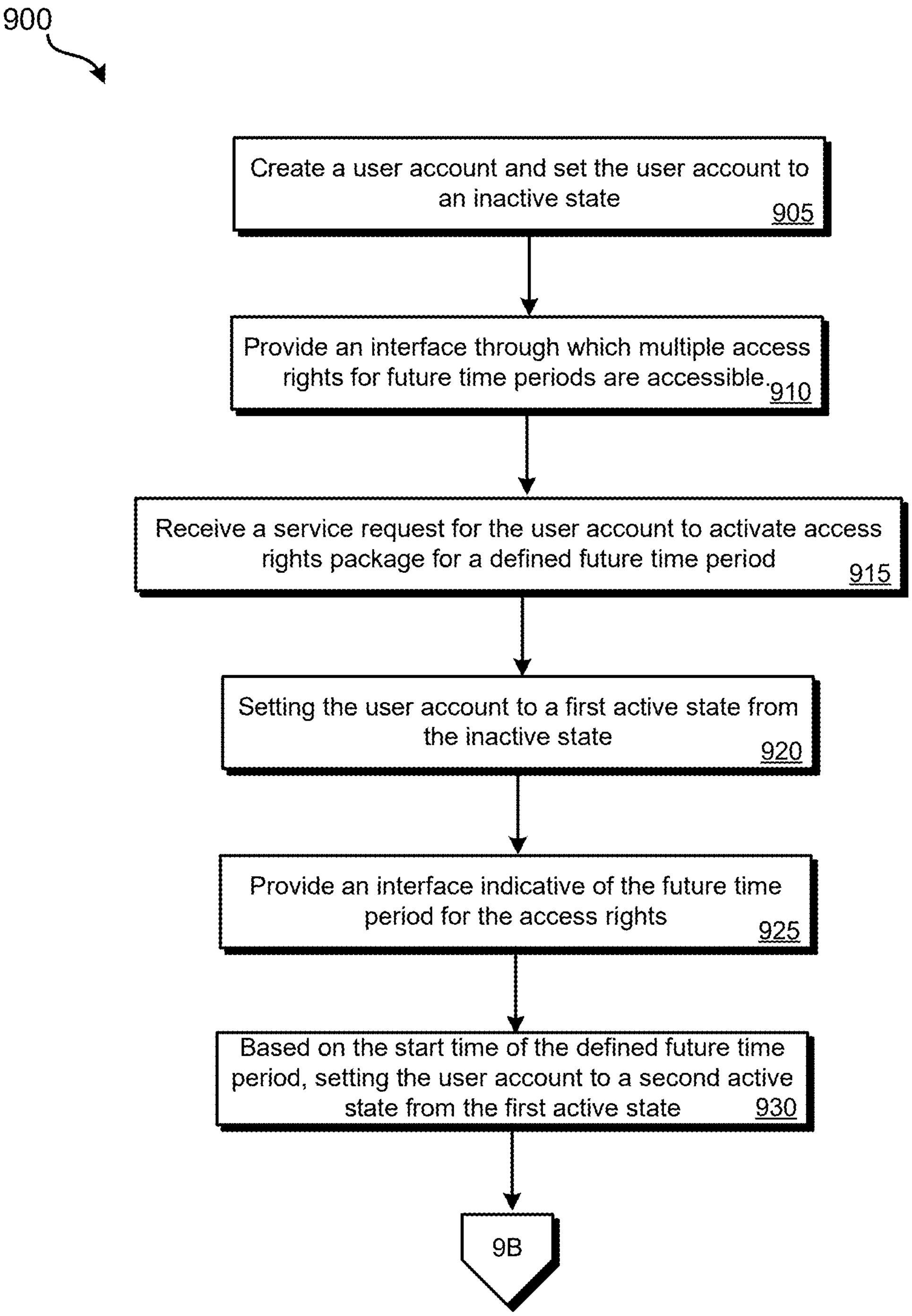
FIGS. 9A and 9B illustrate an embodiment of a method for managing future temporary access rights to streaming media content.
Figure 9B:
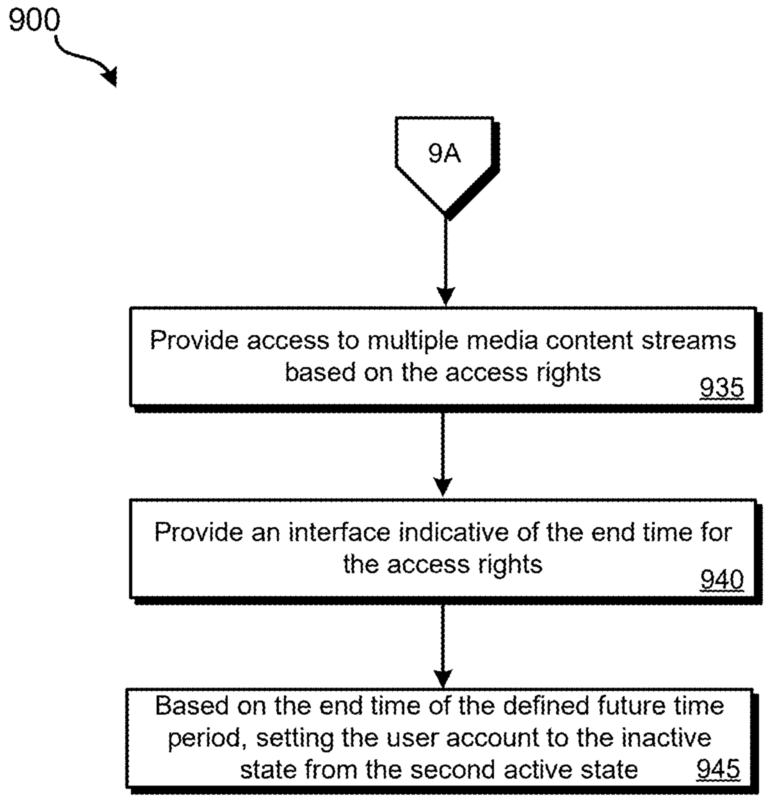

Various methods may be performed using the systems, states, and user interfaces detailed in relation to FIGS. 1-8. FIGS. 9A and 9B illustrate an embodiment of a method 900 for managing future temporary access rights to streaming media content.

At block 905, a user account is created and set to an inactive state at a content distribution system. The process may begin when a user downloads an application to a computerized device, such as a smart television, streaming device, tablet computer, or smartphone, and creates a user account. Additionally or alternatively, this may be performed via a television connected with a television receiver. At the time of creation, if the user does not immediately purchase any access rights, the account is set to an inactive state. While in this inactive state, the user account is not permitted to access certain sets of media content streams that require payment, although other content such as free content media streams and/or on-demand media may still be accessible.

At block 910, the content distribution system provides an interface for providing a user with access to access rights packages for future time periods via the computerized device. While the account is in the inactive state, the content distribution system can present one or more user interfaces that allow a user to select an access rights package, which can include the user selecting a duration and defining when the access rights package is to begin (e.g., immediately, on a particular day). These access rights can be for a defined period of time in the future and correspond to a defined set of media content streams. An interface may present multiple access rights packages from which a user can select. For example, referring to FIG. 3, options could include a "Day Pass," "Weekend Pass," or "Week Pass." While in the inactive state, various additional user interfaces may be accessed to allow a user to understand which content media streams will be accessible if an access rights package for a particular time period is obtained. For example, user interface 600, user interface 700, and user interface 800 are all user interfaces that may be accessed in the inactive state to confirm which content media streams and particular pieces of media content will be available if an access rights package for a particular time period is obtained.

At block 915, a service request is received to activate future access rights package. A service request is received by the content distribution system in which the user selected an access rights package for a particular time period. For example, a user may be permitted to select from a list of upcoming weekends for a "Weekend Pass" or from a list of upcoming weeks for a "Week Pass." A billing account tied to the user account can then be billed in exchange for providing access to the set of media content streams associated with the access rights package.

At block 920, the user account is set to a first active state from the inactive state at the content distribution system. Once access rights for a future period have been obtained by the user, the account is transitioned from the inactive state to a first active state. This transition occurs assuming that the start date and time of the access period is not immediate.

At block 925, a user interface is output by the computerized device that indicates the future access period. This UI being output can be controlled or triggered by the content distribution system and, specifically, the state-based UI generator. In the first active state, one or more user interfaces can be caused to be presented that provide the date and time at which access to the set of media content streams associated with the access rights package will begin. An example is user interface 400, which is presented when an account is in the first active state and includes a region 410 defining the start time and date for the access rights package. This allows a user to confirm that a desired piece of programming will be available during the time period for which the rights were obtained.

At block 930, the user account is set to a second active state from the first active state at the content distribution system in response to the date and time of the start of the access rights package being reached. The user account is given access to the set of media content streams at this time at block 935 by the content distribution system in response to block 930 being performed. This access is in addition to any content that was already available in the inactive state, such as free channels or on-demand content. Content distributor 116 can be responsible for causing the media content streams to be transmitted to the user's device based on information in the account database. For a satellite television receiver, content distributor 116 may control whether a cryptographic key is provided to allow for decryption of the broadcasted content.

At block 940, a user interface can be output via the computerized device, as instructed by the content distribution system, that indicates when the access rights of the access rights package will end. While the account is in the second active state, the system may present one or more user interfaces that define when access to the set of media content streams will end. User interface 500, as shown in FIG. 5, is an example of an interface used for the second active state. This interface includes region 510 that defines the end time and date at which access to the media content streams will conclude for the current access rights package. Region 510 can also specify the type of access rights that were obtained for the user account.

At block 945, following block 935 and block 940, the user account can be returned to the inactive state. Based on the end time of the access rights package, the user account is transitioned from the second active state back to inactive state 220. The account can then remain in inactive state 220 until a new access rights package is obtained for the user account.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the scope of the claims.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the scope of the claims. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for managing future temporary access rights to streaming media content, the method comprising:

receiving, by a streaming media content distribution system, a service request for a user account indicative of a defined future time period for which access is permitted to a first plurality of media content streams, wherein:

the service request is received while the user account is in an inactive state; and the defined future time period defines a start time that occurs in the future and an end time that occurs farther in the future;

in response to the received service request, setting, by the streaming media content distribution system, the user account to be in a first active state, wherein:

when the streaming media content distribution system is accessed by a streaming media player in association with credentials of the user account in the first active state, the first active state causes information corresponding to the defined future time period to be presented, the first plurality of media content streams to be inaccessible, and a second plurality of media content streams to be accessible; and the second plurality of media content streams does not include any media content streams of the first plurality of media content streams;

based on the start time, setting, by the streaming media content distribution system, the user account to a second active state, wherein:

when the streaming media content distribution system is accessed by the streaming media player in association with the credentials of the user account in the second active state, the second active state causes the first plurality of media content streams to be accessible; and based on the end time, setting, by the streaming media content distribution system, the user account to be in the inactive state, wherein:

when the streaming media content distribution system is accessed by the streaming media player in association with the credentials of the user account in the inactive state, the inactive state causes the first plurality of media content streams to be inaccessible.

2. The method for managing future temporary access rights to streaming media content of claim 1, further comprising:

causing a user interface to be output that indicates at least some media content streams of the plurality first of media content streams and a plurality of media content items scheduled to be streamed on each of the plurality of media content streams during the defined future time period.

3. The method for managing future temporary access rights to streaming media content of claim 1, further comprising:

receiving, by the streaming media content distribution system, a second service request for the user account requesting allocation of a plurality of future temporary access rights packages, wherein the start time and stop time for each of the plurality of future temporary access rights packages is undefined at the time the second service request is received.

4. The method for managing future temporary access rights to streaming media content of claim 1, wherein:

when the streaming media content distribution system is accessed by the streaming media player in association with credentials of the user account in the inactive state, the second plurality of media content streams is accessible via the user account.

5. The method for managing future temporary access rights to streaming media content of claim 1, further comprising:

causing a user interface to be output by the media streaming device that indicates a plurality of media content items that correspond to only sporting events scheduled to be streamed on the first plurality of media content streams during the defined future time period.

6. The method for managing future temporary access rights to streaming media content of claim 1, further comprising:

receiving, by the streaming media content distribution system, a selection of the defined future time period from a plurality of defined future time period options, wherein the plurality of defined future time period options have been predefined by the streaming media content distribution system.

7. The method for managing future temporary access rights to streaming media content of claim 1, further comprising:

causing a user interface to be presented to be output by the media streaming device while in the second active state, wherein the user interface indicates the end time.

8. The method for managing future temporary access rights to streaming media content of claim 1, further comprising:

causing a user interface to be output by the media streaming device while in the inactive state, wherein the user interface provides a plurality of access duration elements for a plurality of future time periods, each of which provide access to a specific media content item.

9. The method for managing future temporary access rights to streaming media content of claim 1, further comprising:

causing a user interface to be presented to be output by the media streaming device while in the first active state, wherein the user interface indicates the start time of the defined future time period.

10. A streaming media content distribution system for managing future temporary access rights to streaming media content, the streaming media content distribution system comprising:

one or more processors; and a memory communicatively coupled to the processor, the memory storing instructions that, when executed by the processor, cause the one or more processors to:

receive a service request for a user account indicative of a defined future time period for which access is permitted to a first plurality of media content streams, wherein:

the service request is received while the user account is in an inactive state; and the defined future time period defines a start time that occurs in the future and an end time that occurs farther in the future;

in response to the received service request, set the user account to be in a first active state, wherein:

when the streaming media content distribution system is accessed by a streaming media player in association with credentials of the user account in the first active state, the first active state causes information corresponding to the defined future time period to be presented, the first plurality of media content streams to be inaccessible, and a second plurality of media content streams to be accessible; and the second plurality of media content streams does not include any media content streams of the first plurality of media content streams;

based on the start time, set the user account to a second active state, wherein:

when the streaming media content distribution system is accessed by the streaming media player in association with the credentials of the user account in the second active state, the second active state causes the first plurality of media content streams to be accessible; and based on the end time, set the user account to be in the inactive state, wherein:

when the streaming media content distribution system is accessed by the streaming media player in association with the credentials of the user account in the inactive state, the inactive state causes the first plurality of media content streams to be inaccessible.

11. The streaming media content distribution system of claim 10, wherein the instructions, when executed by the one or more processors, further cause the one or more processors to cause a user interface to be output that indicates a plurality of media content streams and a plurality of media content items scheduled to be streamed on each of the plurality of media content streams during the defined future time period.

12. The streaming media content distribution system of claim 10, wherein the instructions, when executed by the one or more processors, further cause the one or more processors to receive a second service request for the user account requesting allocation of a plurality of future temporary access rights packages, wherein a respective start time and a respective stop time for each of the plurality of future temporary access rights packages is undefined at the time the second service request is received.

13. The streaming media content distribution system of claim 10, wherein when the streaming media content distribution system is accessed by the streaming media player in association with credentials of the user account in the inactive state, the second plurality of media content streams is accessible via the user account.

14. The streaming media content distribution system of claim 10, wherein the instructions, when executed by the one or more processors, further cause the one or more processors to cause a user interface to be output by the media streaming player that indicates a plurality of media content items that correspond to only sporting events scheduled to be streamed on the first plurality of media content streams during the defined future time period.

15. The streaming media content distribution system of claim 10, wherein the instructions, when executed by the one or more processors, further cause the one or more processors to receive a selection of the defined future time period from a plurality of defined future time period options, wherein the plurality of defined future time period options have been predefined by the streaming media content distribution system.

16. The streaming media content distribution system of claim 10, wherein the instructions, when executed by the one or more processors, further cause the one or more processors to cause a user interface to be output by the media streaming player while in the second active state, wherein the user interface indicates the end time.

17. The streaming media content distribution system of claim 10, wherein the instructions, when executed by the one or more processors, further cause the one or more processors to cause a user interface to be output by the media streaming player while in the inactive state, wherein for a specific media content item, the user interface provides a plurality of access duration elements, each of which provides access for a different future time period.

18. The streaming media content distribution system of claim 10, wherein the instructions, when executed by the one or more processors, further cause the one or more processors to cause a user interface to be output by the media streaming player while in the first active state, wherein the user interface indicates the start time of the defined future time period.

19. The streaming media content distribution system of claim 10, further comprising the streaming media player, wherein the streaming media player communicates with the one or more processors via the Internet.

20. A non-transitory processor-readable medium, comprising processor-readable instructions configured to cause one or more processors of a streaming media content distribution system to:

receive a service request for a user account indicative of a defined future time period for which access is permitted to a first plurality of media content streams, wherein:

the service request is received while the user account is in an inactive state; and the defined future time period defines a start time that occurs in the future and an end time that occurs farther in the future;

in response to the received service request, set the user account to be in a first active state, wherein:

when the streaming media content distribution system is accessed by a streaming media player in association with credentials of the user account in the first active state, the first active state causes information corresponding to the defined future time period to be presented, the first plurality of media content streams to be inaccessible, and a second plurality of media content streams to be accessible; and the second plurality of media content streams does not include any media content streams of the first plurality of media content streams;

based on the start time, set the user account to a second active state, wherein:

when the streaming media content distribution system is accessed by the streaming media player in association with the credentials of the user account in the second active state, the second active state causes the first plurality of media content streams to be accessible; and based on the end time, set the user account to be in the inactive state, wherein:

when the streaming media content distribution system is accessed by the streaming media player in association with the credentials of the user account in the inactive state, the inactive state causes the first plurality of media content streams to be inaccessible.

* * * * *